(12) United States Patent
Xu et al.

(10) Patent No.: US 11,563,521 B2
(45) Date of Patent: Jan. 24, 2023

(54) METHOD AND APPARATUS FOR PORT CHANNELIZATION AT PHYSICAL LAYER

(71) Applicant: HUAWEI TECHNOLOGIES CO., LTD., Guangdong (CN)

(72) Inventors: Li Xu, Shenzhen (CN); Min Zha, Shenzhen (CN); Renlei Wang, Shenzhen (CN); Zhigang Zhu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/163,819

(22) Filed: Feb. 1, 2021

(65) Prior Publication Data

US 2021/0152286 A1    May 20, 2021

Related U.S. Application Data

(63) Continuation of application No. PCT/CN2019/103399, filed on Aug. 29, 2019.

(30) Foreign Application Priority Data

Aug. 30, 2018   (CN) .......................... 201811000626.7

(51) Int. Cl.
*H04L 1/00* (2006.01)
*H04W 28/06* (2009.01)
*H04W 28/24* (2009.01)

(52) U.S. Cl.
CPC ......... *H04L 1/0071* (2013.01); *H04W 28/065* (2013.01); *H04W 28/24* (2013.01)

(58) Field of Classification Search
CPC ............... H04L 1/0071; H04L 25/4908; H04L 12/40006; H04L 49/352; H04L 49/40;
(Continued)

(56) References Cited

U.S. PATENT DOCUMENTS 6,944,729 B2 * 9/2005 Woodard .......... H03M 13/2782
                                                    711/158
10,439,761 B1 * 10/2019 Pandey ................. H04L 1/0025
(Continued)

FOREIGN PATENT DOCUMENTS

CN         1512684 A    7/2004
CN       101369861 A    2/2009
(Continued)

OTHER PUBLICATIONS

Glen Kramer et al: "Multi-Point Reconciliation Sublayer (MPRS) [Upstream Direction]", IEEE, Aug. 2016, 28 pages.
(Continued)

*Primary Examiner* — Chi H Pham
*Assistant Examiner* — Vladislav Y Agureyev
(74) *Attorney, Agent, or Firm* — Womble Bond Dickinson (US) LLP

(57) ABSTRACT

A method of data processing is applied to a communications device including a first sublayer. A physical sublayer is added above a physical coding sublayer (PCS) of a physical layer, and the physical sublayer is connected to media independent interfaces (xMIIs) with different Ethernet rates. Data signals from different media access control clients (MAC) are interleaved using the physical sublayer. Then, a tx_cmd command is used to instruct the PCS to correspondingly encode an xMII signal. Finally, an encoded xMII signal is sent through a port. According to this method, an encoding function of the PCS may continue to be used, to decouple interleaving from encoding and perform the interleaving through an xMII interface. In this case, port channelization can be implemented for ports with multiple rates, and transmission of a high-priority service is ensured when there is an excessively large quantity of service flows in a transmission process.

20 Claims, 8 Drawing Sheets

(58) Field of Classification Search
CPC .. H04L 1/0041; H04W 28/065; H04W 28/24; H04J 2203/0085

See application file for complete search history.

(56) References Cited

U.S. PATENT DOCUMENTS

| | | | |
|---|---|---|---|
| 2006/0104302 A1 | 5/2006 | Cho et al. | |
| 2010/0191525 A1* | 7/2010 | Rabenko | H04N 21/2383 704/211 |
| 2014/0016926 A1* | 1/2014 | Soto | H04B 10/0775 398/16 |
| 2015/0171892 A1* | 6/2015 | Yu | H04L 25/4908 370/254 |
| 2016/0197743 A1* | 7/2016 | Su | H04L 12/66 370/401 |
| 2017/0026128 A1* | 1/2017 | Remein | H04L 49/9047 |
| 2017/0134149 A1* | 5/2017 | Chini | H04B 1/3822 |
| 2017/0289018 A1* | 10/2017 | Iyer | H04L 41/0823 |
| 2018/0316435 A1* | 11/2018 | Remein | H04Q 11/0067 |
| 2019/0044650 A1* | 2/2019 | Khan | H04L 1/0072 |
| 2019/0068307 A1* | 2/2019 | Kim | H04J 3/1652 |
| 2019/0312715 A1* | 10/2019 | Graber | H04L 25/0274 |
| 2020/0044733 A1* | 2/2020 | Soto | H04J 14/0257 |
| 2020/0145119 A1* | 5/2020 | Li | H04J 3/1664 |
| 2020/0195760 A1* | 6/2020 | Wang | H04J 3/16 |
| 2020/0266898 A1* | 8/2020 | Soto | H04B 10/2589 |

FOREIGN PATENT DOCUMENTS

| | | |
|---|---|---|
| CN | 104919815 A | 9/2015 |
| CN | 105052062 A | 11/2015 |
| CN | 106411454 A | 2/2017 |
| CN | 106612220 A | 5/2017 |
| WO | 2016054525 A1 | 4/2016 |
| WO | 2018095303 A1 | 5/2018 |

OTHER PUBLICATIONS

IEEE Draft P802.3ca/D1.x. Draft Amendment to IEEE Std 802.3-2015, IEEE P802.3ca 100G-EPON Phy Task Force, Jul. 10, 2018, 36 pages.

Stephen J. Trowbridge; David R. Stauffer: "Flex Ethernet Implementation Agreement 1.0. IA# OIF-FLEXE-01.0", OIF, Mar. 2016 ,32 pages.

IEEE Std 802.3-2015, IEEE Standard for Ethernet, Section Six, 699 pages.

MediaTek Inc., DL Multicast over PDSCH. 3GPP TSG-RAN2 #89bis Meeting, Bratislava, Slovakia, Apr. 20-24, 2015, R2-151362, 3 pages.

* cited by examiner

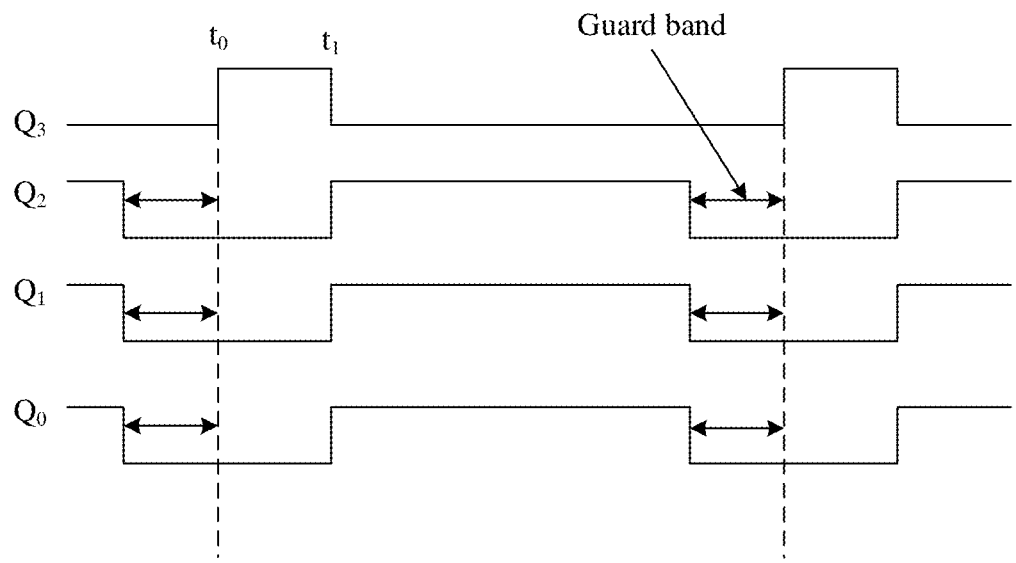

A PLPC layer obtains at least two data signals from different media access control clients (MAC clients) — 410

The PLPC layer performs interleaving processing on the at least two data signals from the media access control clients (MAC clients), to generate an interleaved xMII signal — 420

The PLPC layer sends the interleaved xMII signal to a PCS, so that the PCS encodes the interleaved xMII signal to generate an encoded signal — 430

810
A PLPC layer obtains a media independent interface xMII signal, where the xMII signal is a signal obtained after a PCS decodes an encoded signal 820
The PLPC layer performs deinterleaving processing on the xMII signal to obtain at least two data signals from different media access control clients (MAC clients)

METHOD AND APPARATUS FOR PORT CHANNELIZATION AT PHYSICAL LAYER

CROSS-REFERENCE TO RELATED APPLICATIONS

This application is a continuation of International Application No. PCT/CN2019/103399, filed on Aug. 29, 2019, which claims priority to Chinese Patent Application No. 201811000626.7, filed on Aug. 30, 2018. The disclosures of the aforementioned applications are hereby incorporated by reference in their entireties.

TECHNICAL FIELD

This application relates to the communications field, and more specifically, to a method and an apparatus for implementing port channelization at a physical layer.

BACKGROUND

A port channelization technology can increase certainty and provide a low latency characteristic for a network application. For example, 100 Gbps of a fixed port may be divided into sub-rates required by a plurality of services, and may be specifically divided into different sub-rates such as 5 G, 20 G, and 40 G. In addition, in port channelization, a forwarding mode similar to cut-through forwarding is used, so that time consumption such as table lookup and queuing used in a conventional storing and forwarding (store and forward) mechanism is avoided, and the certainty is further increased and the low latency is further provided. In this way, services are better isolated.

Currently, in the Ethernet, the port channelization technology mainly includes the flexible Ethernet (flex ethernet, FlexE). The flexE is implemented only based on a high-speed Ethernet port, and port channelization is implemented by interleaving encoded 64B/66B code blocks. It can be learned that a specific interleaving scheme needs to be designed for a specific code block in the FlexE.

However, in an existing industrial Ethernet scenario, many services are based on connections of low-speed Ethernet ports, for example, low-speed Ethernet ports used in scenarios such as an industry network and an intra-vehicle network. Different 64B/66B coding mechanisms are used for these low-speed Ethernet ports and high-speed Ethernet ports. Currently, there are a plurality of coding schemes for the low-speed Ethernet ports, such as a 4B/5B coding scheme and an 8B/10B coding scheme. For ports with different rates, a port channelization solution of the FlexE cannot be used universally. Therefore, a universally-used port channelization method is required to implement port channelization for ports with a plurality of rates.

SUMMARY

This application provides a data processing method and apparatus, to implement port channelization for ports with a plurality of rates, and ensure transmission of a high-priority service when there is an excessively large quantity of service flows in a transmission process. In this way, bandwidth waste caused by frame preemption is avoided.

According to a first aspect, a data processing method is provided. The method includes: obtaining at least two data signals from different media access control clients MAC clients; performing interleaving processing on the at least two data signals from the MAC clients, to generate an interleaved media independent interface xMII signal; and sending the interleaved xMII signal to a physical coding sublayer PCS, so that the PCS encodes the interleaved xMII signal to generate an encoded signal.

According to the foregoing technical solution, a sublayer is added to a physical layer, and the first sublayer is a sublayer on the physical coding sublayer PCS of the physical layer. The added sublayer is used to interleave data signals from a plurality of different media access control clients MAC clients, to generate a media independent interface (media-independent interface, xMII) signal. After interleaving, the xMII signal is sent to the PCS for corresponding encoding. Finally, an encoded xMII signal is sent through a port. According to this method, an encoding function of the PCS may continue to be used, to decouple the interleaving from the encoding. In this case, a plurality of existing coding schemes of a low-speed Ethernet and a future newly added coding scheme of a high-speed interface are compatible. In this way, port channelization is implemented at the physical layer.

With reference to the first aspect, in some embodiments of the first aspect, the method further includes: generating first indication information, where the first indication information is used to instruct the PCS to encode the interleaved xMII signal; and sending the first indication information to the PCS, so that the PCS encodes the interleaved xMII signal based on the first indication information, to generate the encoded signal.

According to the foregoing technical solution, the data signals from a plurality of different media access control clients MAC clients are interleaved by using the added physical sublayer. Then, a tx_cmd command is used to instruct the PCS to correspondingly encode the xMII signal. Finally, the encoded xMII signal is sent through the port. According to this method, an encoding function of the PCS may continue to be used, to decouple interleaving from encoding and perform the interleaving and handshaking through an xMII interface. In this case, a change to a standard physical layer is relatively small, and a plurality of existing coding schemes of a low-speed Ethernet and a future newly added coding scheme of a high-speed interface are compatible.

In an embodiment, the first indication information is further used to indicate a type of the interleaved xMII signal.

In an embodiment, the first indication information is further used to indicate the interleaved xMII signal used for a start symbol and/or an end symbol of frame delimitation.

In an embodiment, the newly added physical sublayer may be a physical port channelization (PLPC) sublayer defined in this embodiment of this application.

It should be understood that the PLPC layer generates a sequence of the tx_cmd command corresponding to the xMII data signal. To be specific, there is a one-to-one correspondence between a bit block included in the sequence of the xMII signal and the tx_cmd command. When obtaining the tx_cmd command, the PCS can determine, based on a specific value in the command, that the bit block of the xMII signal corresponding to the value carries a data signal or a non-data signal. For example, when the tx_cmd command obtained by the PCS is 4, the PCS can determine that a corresponding bit block carries a data signal, and the PCS can perform encoding according to a coding scheme of a data block.

It should be further understood that data signals from different MAC layers arrive at the PLPC layer based on configured slots of different MAC corresponding to the data signals. The PLPC layer may add some other blocks to a data block included in the xMII signal based on a fixed slot, for example, a start symbol block representing that the interleaved xMII signal is used for the frame delimitation, a terminate symbol block (T block) representing a sending cycle of a data stream, an idle symbol block (Idle block), or a start symbol (B block) representing a sending cycle of the xMII signal.

In an embodiment, the interleaving processing is a processing mode of interleaving, by the first sublayer in one cycle, the at least two data signals from the MAC clients based on sending slots and a preset interleaving cycle table that correspond to the at least two data signals from the MAC clients.

In an embodiment, the at least two data signals from the MAC client include a data signal from a first-type MAC client, and the obtaining, by a first sublayer, at least two data signals from different MAC clients includes: obtaining, by the first sublayer in an arrival slot of the data signal from the first-type MAC client, the data signal from the first MAC client; and sending, in a sending slot that is of the data signal from the first-type MAC client and that is in one cycle, the data signal from the first-type MAC client.

In an embodiment, the data signal from the first-type MAC client may be periodically sent, or a service corresponding to the data signal from the first-type MAC client herein has a relatively high priority (for scheduled traffic). The PLPC layer obtains the data signal from the first-type MAC client based on the arrival slot that is of the data signal from the first-type MAC client and that is configured by a system, and performs related processing such as interleaving or direct sending.

In an embodiment, the at least two data signals from the MAC clients further include a data signal from a second-type MAC client, and the obtaining, by a first sublayer, at least two data signals from different MAC clients includes: directly obtaining, by the first sublayer, the data signal from the second MAC client, and buffering the data signal from the second MAC client; and sending, in a predefined sending slot of the data signal from the second MAC client, the data signal from the second MAC client.

In an embodiment, the data signal from the second-type MAC client may be aperiodically sent, or a service corresponding to the data signal from the second-type MAC client herein has a relatively low priority (for best effort traffic). The PLPC layer may directly obtain the data signal from the second-type MAC client, but buffer data of the data signal from the second-type MAC client after obtaining the data signal, to wait for a corresponding slot for processing or sending.

The PLPC layer processes flows with different priorities in different ways. When a high-priority flow arrives at the PLPC layer by using MAC #1, the PLPC layer directly performs processing such as interleaving and forwarding, and sends a processed high-priority flow to the PCS for encoding. When a low-priority flow arrives at the PLPC layer by using MAC #2, the low-priority flow needs to be buffered in a buffer-out, and is sent only when a slot that is of the low-priority flow and that is configured by an upper layer arrives, that is, the foregoing predefined sending slot.

It should be understood that regardless of which type of data signal, the data signal may arrive at the PLPC layer based on an arrival slot configured by the upper layer in one cycle, and is forwarded to the PCS in a configured sending slot. The PLPC layer may perform different processing on different types of data signals. For example, the data signal from the second-type MAC client may be sent after being buffered by using the PLPC, to be specific, the data signal from the second-type MAC client is sent based on the sending slot that is of the data signal from the second-type MAC client and that is configured by the upper layer in a sending cycle of one xMII signal.

When there are at least three flows with different priorities, using three flows with different priorities as an example, a high-priority flow may arrive at the PLPC layer based on an arrival slot configured by the upper layer in one cycle, and is forwarded to the PCS in a configured sending slot. Both a second-priority flow and a low-priority flow may arrive at the PLPC layer at any time, and are buffered in the buffer-out at the PLPC layer. The second-priority flow is sent only when a sending slot that is of the second-priority flow and that is configured by the upper layer arrives, and the low-priority flow is sent only when a sending slot that is of the low-priority flow and that is configured by the upper layer arrives. In this way, certainty transmission of the flows with different priorities can be ensured, and normal transmission of a high-priority flow is not affected.

In an embodiment, the first sublayer is further used to activate a carrier sense (CRS) signal, and the CRS is used to suppress a rate of obtaining the data signal.

In an embodiment, the at least two data signals have different media access control layer identifiers MAC IDs, and the at least two data signals have different sending slots in a same cycle.

For example, when data is sent excessively fast at any MAC layer, and consequently a corresponding buffer is about to overflow, the PLPC layer activates the CRS signal, to generate a CRS instruction, and a MAC signal flow sent excessively fast at the MAC layer is suppressed by setting a value of the CRS to 1. It should be understood that the CRS signal herein may be a signal generated by a PMA layer of a transmit end device, and is sent to the PLPC layer by using an upward link. Only when the data is sent excessively fast at any MAC layer, the CRS signal may be activated to generate the CRS instruction to suppress the rate of obtaining the data signal at the MAC layer.

According to a second aspect, a data processing method is provided. The method includes: obtaining a media independent interface xMII signal, where the xMII signal is a signal obtained after a physical coding sublayer PCS decodes an encoded signal; and performing deinterleaving processing on the xMII signal to obtain at least two data signals from different media access control clients MAC clients.

It should be understood that a sending device sends the interleaved and encoded xMII signal to a receiving device, and a PCS of the receiving device receives a corresponding code block, a character, or the like, and performs corresponding decoding processing. Herein, decoding of the PCS of the receiving device corresponds to an encoding process of a PCS of the sending device, and a deinterleaving processing process of a PLPC layer of the receiving device also corresponds to an interleaving processing process of a PLPC layer of the sending device.

In an embodiment, the at least two data signals from the MAC clients have different media access control layer identifiers MAC IDs, and the at least two data signals from the MAC clients have different sending slots in a same cycle.

In an embodiment, the MAC IDs of the at least two data signals from the MAC clients are determined based on a receiving slot that is of the xMII signal and that is in one cycle.

The at least two data signals that are from the MAC clients and that are obtained after being de-interleaved by the PLPC layer have different media access control layer identifiers MAC IDs, and the at least two data signals from the MAC clients have different sending slots in a same cycle. In this case, the PLPC layer can determine the MAC IDs of the at least two data signals from the MAC clients based on the receiving slot that is of the xMII signal and that is in one cycle.

In an embodiment, the deinterleaving processing is a processing mode of interleaving, by the first sublayer in one cycle, the obtained xMII signal based on sending slots and a preset interleaving cycle table that correspond to the at least two data signals from the MAC clients.

In an embodiment, the at least two data signals from the MAC clients include a data signal from a first-type MAC client, and the method further includes: obtaining, in a receiving slot of the data signal from the first-type MAC client, the data signal from the first-type MAC client; and sending, in a sending slot that is of the data signal from the first-type MAC client and that is in one cycle, the data signal from the first MAC.

In an embodiment, the at least two data signals further include a data signal from a second-type MAC client, and the method further includes: directly obtaining the data signal from the second-type MAC client; buffering the data signal from the second-type MAC client, where the data signal from the second-type MAC client includes a complete Ethernet frame; and sending, in a predefined sending slot of the data signal from the second-type MAC client, the data signal from the second-type MAC client.

According to a third aspect, a data processing apparatus is provided, including: an obtaining unit, configured to obtain at least two data signals from different media access control clients MAC clients; a processing unit, configured to perform interleaving processing on the at least two data signals from the MAC clients, to generate an interleaved media independent interface xMII signal; and a sending unit, configured to send the interleaved xMII signal to a physical coding sublayer PCS, so that the PCS encodes the interleaved xMII signal to generate an encoded signal.

In an embodiment, the processing unit is further configured to generate first indication information, where the first indication information is used to indicate a coding scheme for the PCS to encode the interleaved xMII signal; and the sending unit is further configured to send the first indication information to the PCS, so that the PCS encodes the interleaved xMII signal based on the first indication information, to generate the encoded signal.

In an embodiment, the first indication information is further used to indicate a type of the interleaved xMII signal.

In an embodiment, the first indication information is further used to indicate the interleaved xMII signal used for a start symbol and/or an end symbol of frame delimitation.

In an embodiment, the interleaving processing is a processing mode of interleaving, in one cycle, the at least two data signals from the MAC clients based on sending slots and a preset interleaving cycle table that correspond to the at least two data signals from the MAC clients.

In an embodiment, the at least two data signals that are from the MAC clients and that are obtained by the obtaining unit include a data signal from a first-type MAC client, and the obtaining unit is configured to obtain, in an arrival slot of the data signal from the first-type MAC client, the data signal from the first MAC client; and the sending unit is configured to send, in a sending slot that is of the data signal from the first-type MAC client and that is in one cycle, the data signal from the first-type MAC client.

In an embodiment, the at least two data signals that are from the MAC clients and that are obtained by the obtaining unit further include a data signal from a second-type MAC client; the obtaining unit is configured to directly obtain the data signal from the second MAC client, and buffer the data signal from the second MAC client; and the sending unit is further configured to send, in a predefined sending slot of the data signal from the second MAC client, the data signal from the second MAC client.

In an embodiment, the processing unit is further configured to activate a carrier sense CRS signal, and the CRS is used to suppress a rate of obtaining the data signal.

In an embodiment, the at least two data signals have different media access control layer identifiers MAC IDs, and the at least two data signals have different sending slots in a same cycle.

According to a fourth aspect, a data processing apparatus is provided, including: an obtaining unit, configured to obtain a media independent interface xMII signal, where the xMII signal is a signal obtained after a physical coding sublayer PCS decodes an encoded signal; and a processing unit, configured to perform deinterleaving processing on the xMII signal to obtain at least two data signals from different media access control clients MAC clients.

With reference to the fourth aspect, in some embodiments of the fourth aspect, the at least two data signals from the MAC clients have different media access control layer identifiers MAC IDs, and the at least two data signals from the MAC clients have different sending slots in a same cycle.

In an embodiment, the processing unit determines the MAC IDs of the at least two data signals from the MAC clients based on a receiving slot that is of the xMII signal and that is in one cycle.

In an embodiment, the deinterleaving processing is a processing mode of interleaving, by the processing unit in one cycle, the obtained xMII signal based on sending slots and a preset deinterleaving cycle table that correspond to the at least two data signals from the MAC clients.

In an embodiment, the at least two data signals from the MAC clients include a data signal from a first-type MAC client, and the obtaining unit obtains, in a receiving slot of the data signal from the first-type MAC client, the data signal from the first-type MAC client; and the apparatus further includes a first sending unit, configured to send, in a sending slot that is of the data signal from the first-type MAC client and that is in one cycle, the data signal from the first MAC.

In an embodiment, the at least two data signals further include a data signal from a second-type MAC client, and the obtaining unit directly obtains the data signal from the second-type MAC client, and buffers the data signal from the second-type MAC client, where the data signal from the second-type MAC client includes a complete Ethernet frame; and the apparatus further includes a second sending unit, configured to send, in a predefined sending slot of the data signal from the second-type MAC client, the data signal from the second-type MAC client.

According to a fifth aspect, an apparatus is provided. The apparatus includes a transceiver, a memory, a processor, and an instruction that is stored in the memory and that can be run by the processor. The processor executes the instruction to enable the apparatus to implement the method in any one of the first aspect or the embodiments of the first aspect.

According to a sixth aspect, an apparatus is provided. The apparatus includes a transceiver, a memory, a processor, and an instruction that is stored in the memory and that can be run by the processor. The processor executes the instruction to enable the apparatus to implement the method in any one of the second aspect or the embodiments of the second aspect.

According to a seventh aspect, a computer program product is provided. The computer program product includes computer program code, and when the computer program code is run on a computer, the computer is enabled to perform the methods in the foregoing aspects.

According to an eighth aspect, a computer-readable medium is provided. The computer-readable medium stores program code, and when the computer program code is run on a computer, the computer is enabled to perform the methods in the foregoing aspects.

BRIEF DESCRIPTION OF DRAWINGS

FIG. 3 is a schematic diagram of data sending in a frame preemption process;

FIG. 4 is a flowchart of a data processing method according to an embodiment of this application;

DESCRIPTION OF EMBODIMENTS

The following describes the technical solutions of this application with reference to the accompanying drawings.

Figure 1:
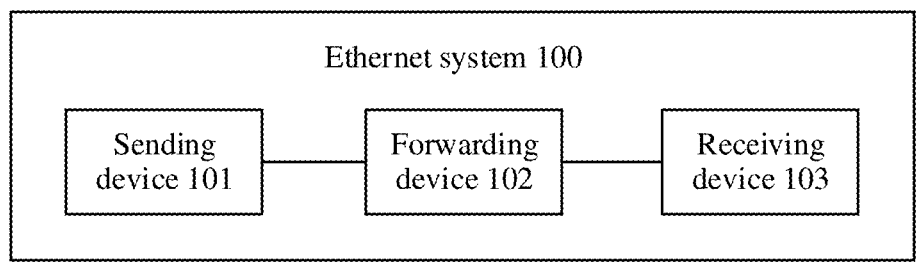
FIG. 1 is an architectural diagram of an Ethernet system according to an embodiment of this application.

An Ethernet system 100 mentioned in this application is first described. As shown in FIG. 1, the Ethernet system 100 includes a sending device 101, a forwarding device 102, and a receiving device 103. The sending device 101, the forwarding device 102, and the receiving device 103 are serially connected. A to-be-transmitted Ethernet frame is sent by the sending device 101, passes through the forwarding device 102, and finally arrives at the receiving device 103.

It should be noted that FIG. 1 shows only one forwarding device, that is, the forwarding device 102. It should be understood that a plurality of forwarding devices may be included between the sending device 101 and the receiving device 103. The to-be-transmitted Ethernet frame is sent by the sending device 101, passes through the plurality of forwarding devices, and finally arrives at the receiving device 103.

It should be understood that the technical solutions provided in the embodiments of this application may be applied to a backbone network, an aggregation network, an access network, an enterprise network, a mobile fronthaul network, or a mobile backhaul network.

It should be further understood that a method provided in the embodiments of this application may be applied to any communications device in the Ethernet system 100, for example, the sending device 101, the forwarding device 102, or the receiving device 103. This is not limited in this application.

With arrival of a 5G era, new services such as a cloud service, augmented reality (AR), virtual reality (VR), and the internet of vehicles emerge, and an Ethernet technology further develops. The third-generation Ethernet is referred to as a flexible Ethernet (FlexE). Introduction of a concept of the FlexE provides a feasible evolution direction for virtualization of an Ethernet physical link. In the FlexE, one or more bonded physical layers constitute a flexible Ethernet group (FlexE group). The FlexE group may be considered as a FlexE link implemented between a receiving device and a sending device. The FlexE link is a logical link. A bandwidth of the logical link is equal to a sum of bandwidths of the plurality of bonded PHYs. In a technical solution of the FlexE, a bandwidth resource of the FlexE group is used by configuring slots (for example, configuring 20 or 80 slots). A virtual link is implemented by configuring the slots. In this way, the FlexE provides a service for a flexible Ethernet client (FlexE client).

When the sending device and the receiving device need to transmit a FlexE client over a virtual connection supported by the FlexE group, the sending device may encode, based on a 64B/66B structure, an Ethernet frame corresponding to the FlexE client, to obtain a 64B/66B data block. Under the control of a flexible Ethernet shim (FlexE shim), the FlexE client is transmitted in a transport network (transport network). Specifically, the FlexE shim is constituted by adding a shim to an intermediate layer of a physical coding sublayer (PCS) layer of the Ethernet.

Figure 2:
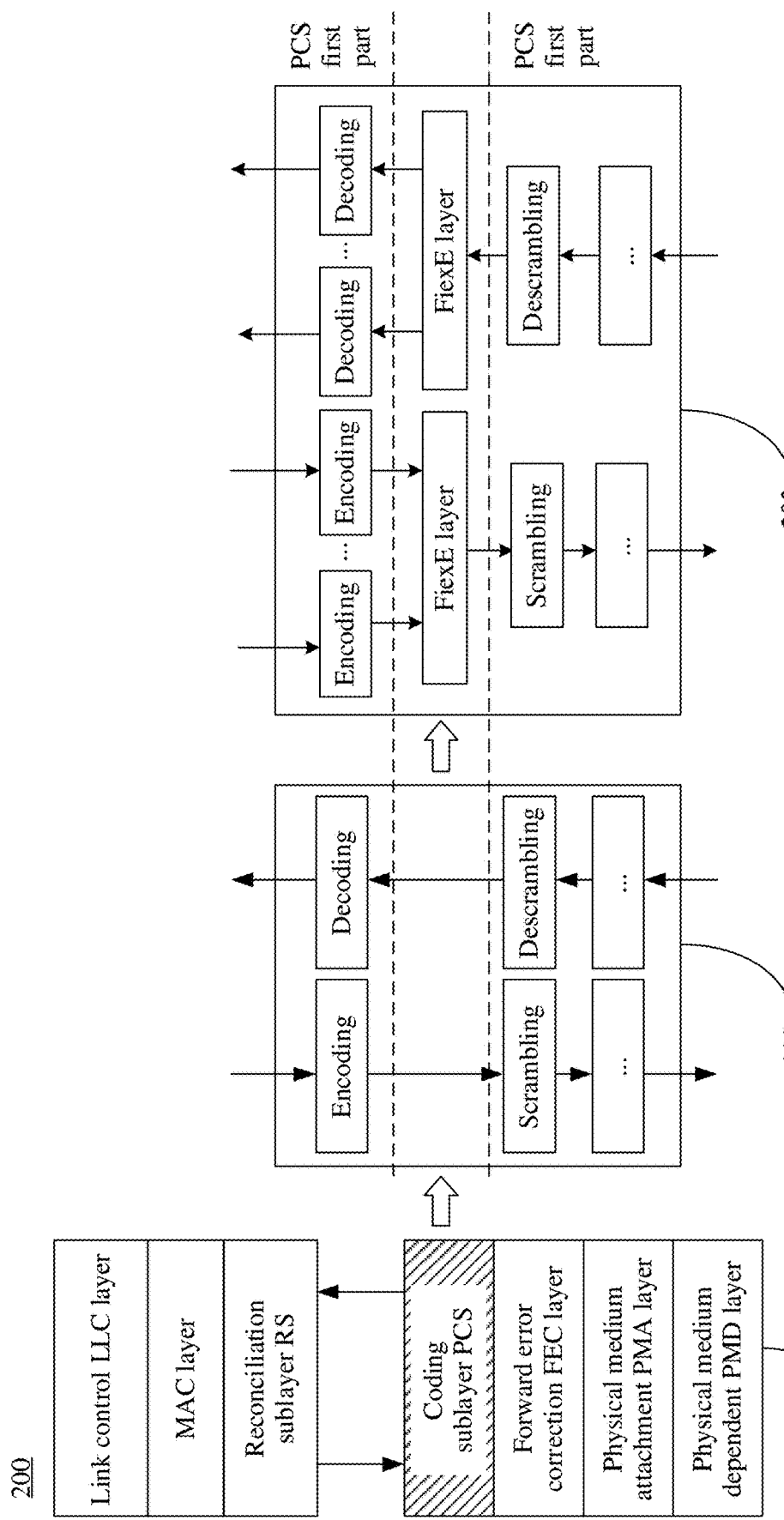
FIG. 2 is an architectural diagram of a protocol stack of an Ethernet system according to an embodiment of this application.

A protocol stack architecture of the FlexE is shown in a part 201 in FIG. 2. It can be seen that the protocol stack architecture of the FlexE includes a link control (LLC) layer, a media access control (MAC) layer, a reconciliation sublayer (RS), a physical coding sublayer (PCS), a forward error correction (FEC) layer, a physical medium attachment (PMA) layer, and a physical medium dependent (PMD) layer, and a FlexE shim layer is added to the PCS.

The MAC layer is responsible for constructing a frame by using bit streams "0" and "1" at the physical layer, and performing an error check by using error check information at a tail of the frame. The MAC sublayer adds a physical address of a target computer to a data frame. After the data frame is transmitted to a MAC layer of a receive end, the MAC layer of the receive end checks whether the address matches its own address, or checks whether the data frame needs to be forwarded based on a forwarding table stored on the receive end. If the address of the target computer matches the address of the receive end, the receive end sends the data frame to an upper layer. If the address in the frame does not match the address of the receive end, the receive end checks whether the data frame needs to be forwarded based on the forwarding table stored on the receive end.

The RS, the PCS, the FEC layer, the PMA layer, and the PMD layer all belong to the physical layer. The RS is used to perform conversion between bit serial data at the MAC layer and a parallel interface at the PCS (The RS adapts the bit serial protocols of the MAC to the parallel format of the PCS service interface). As an example instead of a limitation, the RS may convert data (that is, a FlexE data signal) from the MAC layer into data of a 40 Gigabit media independent interface (XLGMII) or data of a 100 Gigabit media independent interface (CGMII), and implement a reverse process. A main function of the RS is to provide a signal mapping mechanism between a media independent interface (xMII) and the MAC. Herein, a processing method and a processing process of the RS may be similar to those in the prior art. To avoid repetition, detailed descriptions of the processing method and the processing process of the RS are omitted.

The PCS mainly completes encoding and decoding at the physical layer. For example, in a sending direction, the PCS encodes an xMII signal and sends an encoded signal to the PMA layer. In a receiving direction, the PCS decodes a signal received from the PMA to obtain a corresponding xMII signal, as shown in a process shown in a block 202 in FIG. 2. It should be understood that the xMII signal herein is a signal of an xMII interface, and xMII interfaces with various Ethernet port rates or various versions are collectively referred to as the xMII interface. Specifically, 4B/5B encoding in a 100 Mbit/s Ethernet is used as an example. After receiving a data signal from the RS, the PCS uses five-bit binary encoding to represent four-bit binary encoding, to ensure that a binary code stream transmitted in a line has enough jumps. Herein, a possible coding scheme is listed only for describing a function of the PCS. It should be understood that the PCS may have a plurality of coding schemes, for example, an 8B/10B coding scheme and a 64B/66B coding scheme. This is not limited in this application.

The FEC layer mainly implements a bit error correction process. Herein, a processing method and a processing process of the FEC layer may be similar to those in the prior art. To avoid repetition, detailed descriptions of the processing method and the processing process of the FEC layer are omitted.

The PMA layer is mainly used to implement PCS connection to a plurality of physical media, and has main functions including: adapting a PCS lane to a PMD lane, changing a quantity of PMD lanes, changing a data clock, and the like. The PMD layer is mainly used to define parameters of a physical interface connected to transmission media, for example, a wavelength of an optical signal of an optical interface, a type of a connected optical fiber, and a transmission distance.

As shown in a block 203 in FIG. 2, the FlexE shim divides the PCS into three parts, and the three parts may be specifically a PCS first part used for encoding and decoding, a FlexE shim part, and a PCS second part used for scrambling and descrambling. It should be understood that, based on a time division multiplexing (TDM) distribution mechanism, the FlexE shim layer schedules xMII signals of a plurality of client interfaces in a slot manner, and distributes the xMII signals to a plurality of different subchannels. For example, a channel of 100 G can be divided into 20 subchannels of 5 G rate by using the FlexE Shim, and each client-side interface can specify one or more subchannels to implement service isolation. It can be understood that the FlexE shim divides a physical Ethernet port into a plurality of Ethernet channels based on the TDM, so that a network has characteristics similar to exclusive slot occupation and good isolation of the TDM, and has dual characteristics such as Ethernet statistical multiplexing and high network efficiency, to be specific, a function of port channelization is implemented.

As described in the background, the FlexE is implemented by interleaving, based on only a high-speed Ethernet port, an encoded 64B/66B code block to implement port channelization. However, a 64B/66B coding mechanism used for a low-speed Ethernet port is different from a 64B/66B coding mechanism used for a high-speed Ethernet port. Therefore, an existing Flex shim mechanism cannot be directly used. To be specific, a FlexE channelization solution is not universal, and cannot be applied to another port that does not use the 64B/66B coding mechanism.

Table 1 lists port coding and modulation schemes corresponding to different Ethernet port types. As shown in Table 1, PCSs of different low-speed Ethernets use different coding and modulation schemes. In addition, a 4D-PAM5 manner is directly used for a special port type, for example, 1000BASE-T, and no existing coding scheme is available. If the Flex shim mechanism is still used at the PCS layer according to the prior art, a channelization solution needs to be provided for each of different low-speed physical Ethernet ports. In this case, applicability is greatly reduced. In addition, unlike the high-speed Ethernet port that achieves direct current balance by performing scrambling processing after 64B/66B encoding, the low-speed Ethernet port achieves direct current balance through 8B/10B or 8B/6T. In this case, a length of a code block or a symbol is not fixed, and there is an alignment problem. This results in more problems for multiplexing.

TABLE 1

| Ethernet port types | Coding and modulation schemes |
|---|---|
| 10BASE-T1S | 4B/5B |
| 100BASE-T4 | 8B6T |
| 100BASE-TX | 4B/5B |
| 1000BASE-T | 4D-PAM5 |
| 10GBASE-T | LDPC |
| 10GBASE-X | 8B/10B |
| 10GBASE-R | 64B/66B |

To enable a port channelization solution to adapt to different port rates, an embodiment of this application provides a method for implementing port channelization at a physical layer. A sublayer is added to the physical layer, and data signals from a plurality of different media access control clients MAC clients are interleaved by using the added sublayer, to generate a media independent interface (XMII) signal. After the interleaving, a PCS is instructed to encode the xMII signal. Finally, an encoded xMII signal is sent through a port. According to this method, an encoding function of the PCS may continue to be used, to decouple the interleaving from encoding. In this case, a plurality of existing coding schemes of a low-speed Ethernet and a future newly added coding scheme of a high-speed interface are compatible.

In addition, in an existing technical solution, low-latency and high-certainty transmission for services with different priorities such as flows with different priorities is implemented through time-sensitive networking (TSN). The TSN, at an upper layer of a MAC layer, mainly uses control and scheduling of the Institute of Electrical and Electronics Engineers (IEEE) 802.1 protocol based on a current Ethernet architecture to provide a network with certainty, a low latency, a low jitter, and no packet loss caused due to congestion. Core technologies of the TSN include time synchronization, frame preemption, multi-transmit and selective receiving, queue scheduling, and the like.

Specifically, the TSN provides eight queues, and the eight queues may be essentially classified into two types of flows with different priorities: a low-priority flow (best effort traffic) and a high-priority flow (scheduled traffic). Scheduling and transmission are performed by using the two types of flows. The TSN supports the frame preemption to ensure the certainty, the low latency, and the low jitter. However, in an embodiment of a frame preemption mechanism, a 123 B bandwidth guardband is required to ensure that sending of the high-priority flow is not disturbed. As shown in FIG. 3, $Q_3$ represents a high-priority flow. In one cycle, $Q_3$ is sent between $t_0$-$t_1$. $Q_2$, $Q_1$, and $Q_0$ represent low-priority flows, and are sent in a slot in which $Q_3$ is not sent after a $t_1$ moment. During each frame preemption, one guardband is required to ensure that the high-priority flow is not interfered with by the low-priority flow when the high-priority flow is sent. To be specific, there are guard bands before cycles of $Q_2$, $Q_1$, and $Q_0$ start, as marked by arrows in FIG. 3. Each frame preemption causes bandwidth waste caused by an idle guardband of 123 B. In addition, when there is an excessively large quantity of flows in a network, or when a quantity of preemption times is excessively large, N times of preemption cause waste of a bandwidth of N*123 B. Such waste is unacceptable for a low-speed Ethernet port (for example, 10 Mbps).

According to the method for implementing port channelization at a physical sublayer provided in this embodiment of this application, different data processing processes can be used for flows with different priorities at the physical sublayer, to avoid bandwidth waste caused, in a TSN frame preemption mechanism, when there is an excessively large quantity of flows in a network or when a quantity of preemption times is excessively large.

In an embodiment, the physical sublayer may be a physical layer port channelization (PLPC) sublayer. In this embodiment of this application, the PLPC layer is used as the physical sublayer for related description.

In an embodiment, the PLPC layer may be a sublayer of an RS layer, to be specific, a function of the PLPC layer can be implemented by the RS layer. Alternatively, the PLPC layer may be a physical sublayer newly added between an RS layer and the PCS. As long as a data signal sent from the PLPC layer is represented in a form of an xMII signal, it is ensured that an input received by the PCS is the xMII signal.

FIG. 4 is a flowchart of a data processing method according to an embodiment of this application. It should be understood that the method 400 is applied to a communications device that includes a physical port channelization PLPC sublayer, the PLPC layer is a sublayer above a physical coding sublayer PCS of a physical layer, and the PLPC layer is connected to media independent interfaces xMIIs with different Ethernet rates. The following describes each operation of the method 400 in detail.

S410: The PLPC layer obtains at least two data signals from different media access control clients MAC clients.

It should be understood that the PLPC layer may receive at least two different data signals. To be specific, the PLPC layer may receive at least two data signals from different MAC layers (or MAC entities). The at least two data signals have different media access control layer identifiers MAC IDs, and the at least two data signals have different sending slots in a same cycle. For example, the at least two data signals are sent in a slot configured by an upper-layer application. Specifically, as shown in Table 2, one MAC ID corresponds to one data signal, and the data signal is sent in a sending slot configured by the upper-layer application. For example, in one cycle, a data signal with MAC #1 is sent in a slot whose slot identifier (slot ID) is 1, 2, or 3.

TABLE 2

| MAC identifier (MAC ID) | Slot identifier (slot ID) |
|---|---|
| 1 | 1, 2, or 3 |
| ... | ... |
| n | X, X, or X |

Figure 5:
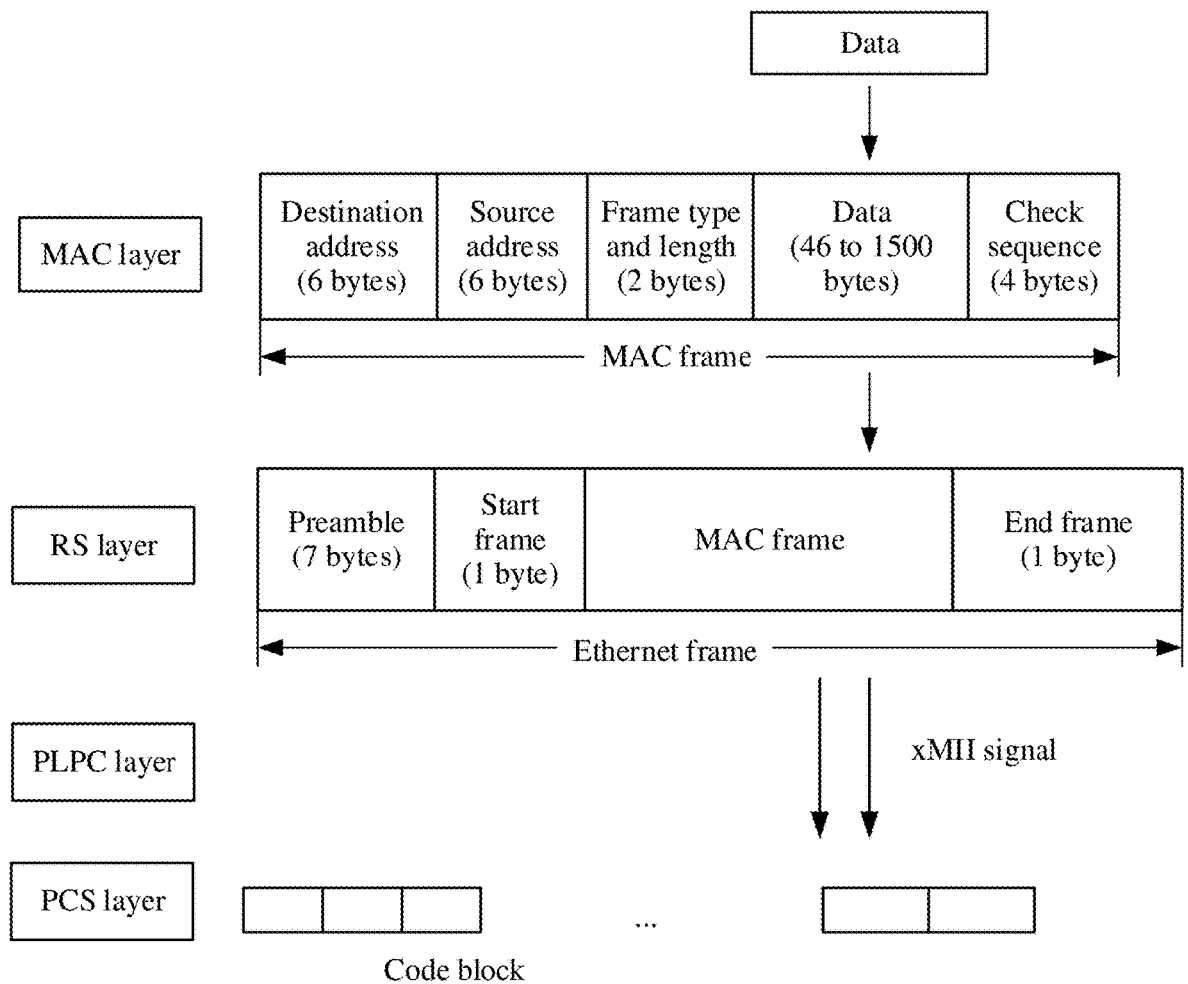
FIG. 5 is a schematic diagram of a data format change in a data processing process according to an embodiment of this application.

FIG. 5 is a schematic diagram of a data format change in a data processing process according to an embodiment of this application. It should be understood that data (a packet or data) sequentially passes through a MAC layer and a reconciliation sublayer RS from an upper-layer application. First, the data constitutes a MAC frame at the MAC layer, and is sent in a form of the MAC frame. As shown in FIG. 5, the MAC frame may include a six-byte destination address, a six-byte source address, a two-byte frame type and length, data of 46 to 1500 bytes, and a four-byte frame trailer check sequence. Before sending the MAC frame, the RS needs to determine a 12-byte interframe gap, a seven-byte preamble, a one-byte start frame delimiter (SFD), and a one-byte1 end frame delimiter (EFD). When receiving the MAC frame, the RS combines the MAC frame between the SFD and the EFD to constitute an Ethernet frame. Consecutive Ethernet frames constitute a data signal input to the PLPC layer.

In an embodiment, the signal input to the PLPC layer after passing through the RS may be an xMII signal, and the RS sends the xMII signal to the PLPC layer.

It should be understood that the xMII signal herein may be a data signal. For example, the PLPC layer receives a data stream sent by the RS. The xMII signal may further include a control signal. Herein, the PLPC may continue to use some functions of an original PCS layer, distinguish a data signal from a non-data signal based on a type of the xMII signal, and perform corresponding subsequent processing, for example, continue to transmit the data signal to a lower layer.

Figure 6:
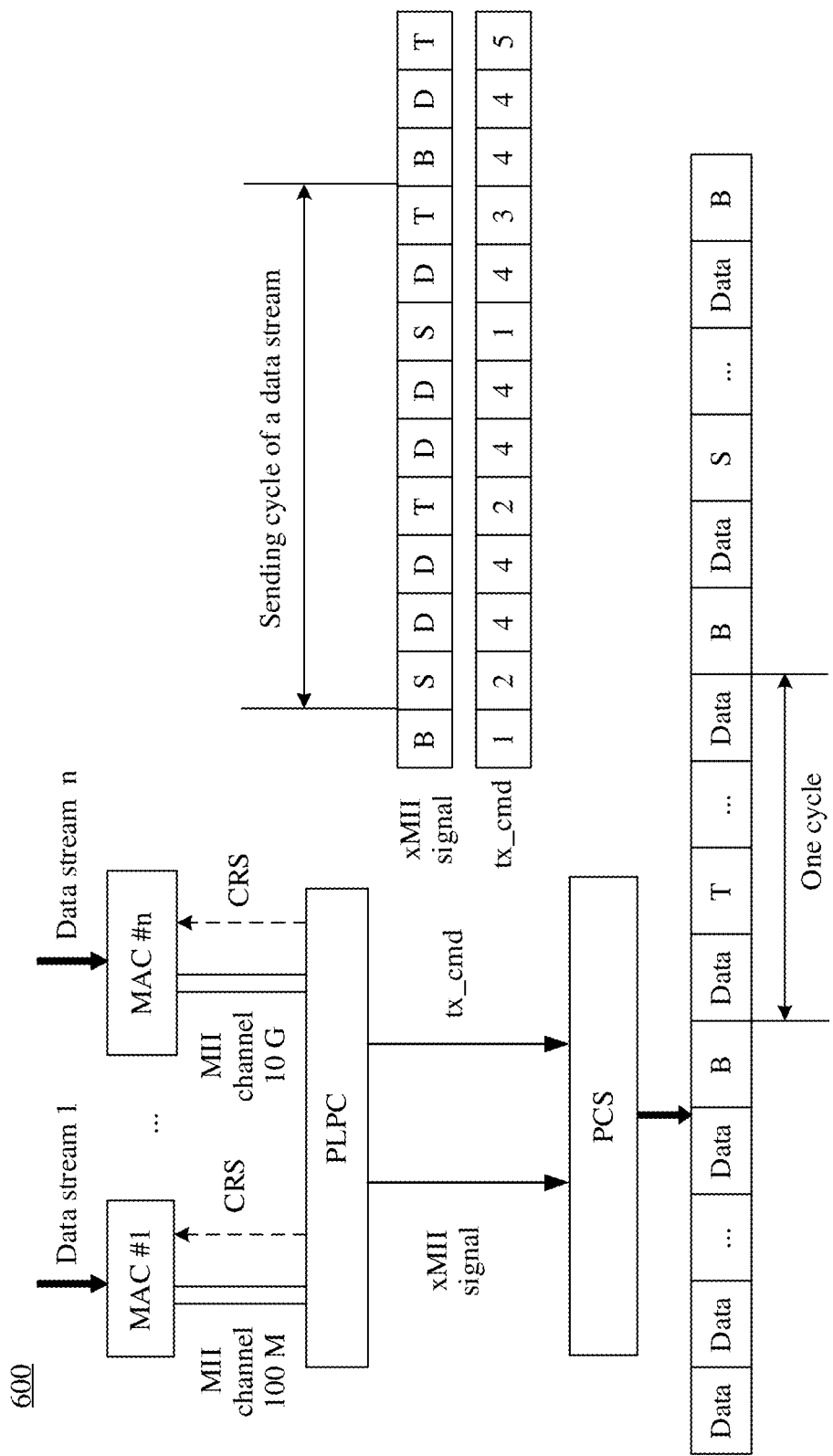
FIG. 6 is a schematic diagram of a data processing process according to an embodiment of this application.

In an embodiment, different MAC layers correspond to different RS s, different RS s correspond to different ports, and different Ethernet ports may have different transmission rates. To be specific, the PLPC layer can receive a plurality of signals from ports with different rates. FIG. 6 is a schematic diagram of a data processing process according to an embodiment of this application. In FIG. 6, a PLPC layer obtains at least two data signals. Specifically, MAC #1 corresponds to an Ethernet port whose port rate is 100 M, and MAC #n corresponds to an Ethernet port whose port rate is 10 G.

S420: The PLPC layer performs interleaving processing on the at least two data signals from the MAC clients, to generate an interleaved xMII signal.

After receiving corresponding data signals sent from different MAC layers and RS layers, the PLPC layer can distinguish data signals or non-data signals based on a type of the xMII signal.

When the xMII signal is a data signal, the PLPC layer performs interleaving based on a configured interleaving cycle table (cycle calendar). Specifically, the PLPC layer receives different data streams and performs interleaving processing on bit blocks included in the data streams. It should be understood that the interleaving processing is a processing mode of interleaving, by the PLPC layer in one cycle, the at least two data signals from the MAC clients based on sending slots and a preset interleaving cycle table that correspond to the at least two data signals from the MAC clients.

It should be further understood that a mode of configuring the interleaving table is not limited in this embodiment of this application. For example, the interleaving table may be configured by using higher layer signaling, or may be configured by using physical layer signaling. In this embodiment of this application, the higher layer signaling may be radio resource control (RRC) signaling, MAC layer signaling, or the like.

For at least two types of data signals from Ethernet port with different rates, for example, data signals from two different data streams shown in FIG. 6, to be specific, a data signal that is sent by using the MAC #1 and that corresponds to the port rate of 100 M and a data signal that is sent by using the MAC #n and that corresponds to the port rate of 10 G, an interleaved signal is generated by interleaving the two types of data signals.

In an embodiment, the xMII signal further includes a non-data signal, for example, a possible sequence of the interleaved xMII signal shown in FIG. 6. Each data signal is sent based on a cycle configured by an upper-layer application. Therefore, when the data signal is to be sent, a specific bit block may be generated at a port to indicate start of one cycle. For example, for a bit block B in a sequence of the xMII signal in FIG. 6, a sending end moment of the bit block B may be used as a start moment of a next cycle.

In an embodiment, in a process of interleaving data signals by the PLPC layer, for example, data signals sent from different MAC layers include a plurality of data blocks denoted as data blocks or D blocks, and services corresponding to the data signals from the different MAC layers have a same priority. It should be understood that the data blocks arrive at the PLPC layer based on configured slots of the different MAC corresponding to the data blocks. The PLPC layer may add some other blocks to the data blocks based on a fixed slot, for example, a start symbol block representing a sending cycle of one data stream, a terminate symbol block (T block) representing a sending cycle of one data stream, an idle symbol block (Idle block), or a start symbol (B block) representing a cycle of an xMII signal. It should be further understood that the sending cycle of the data stream and the cycle of the xMII signal herein may be different cycles, or may be a same cycle. FIG. 6 shows an embodiment in which a cycle, using a B block as a start position, may correspond to the cycle of the xMII signal before a next B block appears, and a cycle, using S as a start symbol block and using T as a terminate symbol block, corresponds to the sending cycle of the data stream.

In an embodiment, the bit block B may correspond to a data block constituted by a sequence of the seven-byte preamble in the Ethernet frame.

In an embodiment, the at least two data signals from the MAC clients include a data signal from a first-type MAC client; and the first sublayer obtains, in an arrival slot of the data signal from the first-type MAC client, the data signal from the first MAC client, and sends, in a sending slot that is of the data signal from the first-type MAC client and that is in one cycle, the data signal from the first-type MAC client.

When the at least two data signals from the MAC clients further include a data signal from a second-type MAC client, the first sublayer directly obtains the data signal from the second MAC client, and buffers the data signal from the second MAC client, and sends, in a predefined sending slot of the data signal from the second MAC client, the data signal from the second MAC client.

In an embodiment, the data signal from the first-type MAC is obtained periodically, and the data signal from the second-type MAC client is obtained aperiodically. Whether types of the at least two obtained data signals from the MAC clients are same or not, the upper-layer application configures different sending slots for the two data signals, and corresponding processing and sending by the PLPC layer are performed based on a configured slot.

Alternatively, a service corresponding to the data signal from the first-type MAC client herein may have a higher priority (for scheduled traffic). The PLPC layer obtains, in the arrive slot that is of the data signal from the first-type MAC client and that is configured by a system, the data signal from the first-type MAC client, and performs related processing such as interleaving or direct sending. Herein, a service corresponding to the data signal from the second-type MAC client may have a lower priority (for best effort traffic). The PLPC layer may directly obtain the data signal from the second-type MAC client, but buffer data of the data signal from the second-type MAC client after obtaining the data signal, to wait for a corresponding slot for processing or sending.

Figures 7, 8:
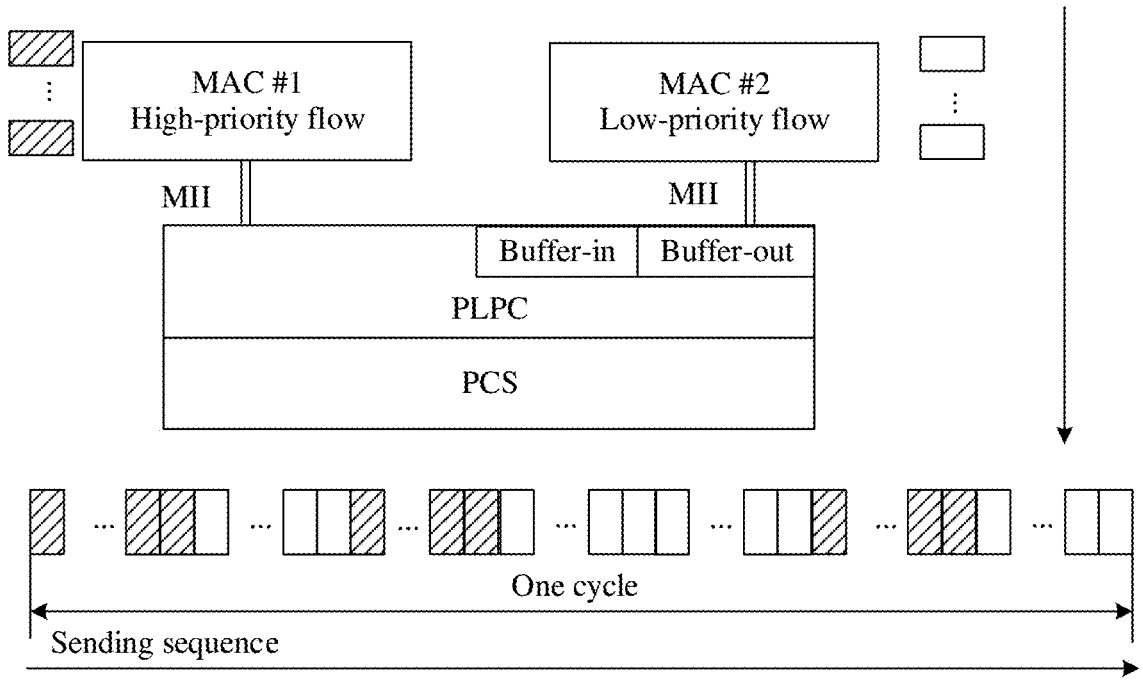
FIG. 7 is a schematic diagram of another data processing method according to an embodiment of this application.
FIG. 8 is a flowchart of still another data processing method according to an embodiment of this application.

FIG. 7 is a schematic diagram of another data processing method according to an embodiment of this application. When all flows from different MAC layers are to be sent, priorities of the flows can be configured for a sending device. Flows from two MAC layers are used as an example. In an egress direction of the sending device shown in FIG. 7, for a port with a rate (for example, a port with 10 Mbps), split-flow of two channels is implemented through two standard xMII interfaces. A channel 1 for sending MAC #1 is used to transmit a high-priority flow, and a channel 2 for sending MAC #2 is used to transmit a low-priority flow.

It should be understood that the flow has periodicity, and the flow may be sent through control and configuration by an upper layer. The high-priority flow and the low-priority flow may arrive in slots corresponding to a same cycle, and the high-priority flow and the low-priority flow arrive at the PLPC layer respectively based on sending cycles configured by the upper layer. For example, the high-priority flow (for scheduled traffic) arrives only in a fixed slot in a cycle of the high-priority flow, and the low-priority flow (for best effort traffic) may arrive at any time.

It can be seen from FIG. 7 that the PLPC layer processes flows with different priorities in different ways. When a high-priority flow arrives at the PLPC layer by using MAC #1, the PLPC layer directly performs processing such as interleaving and forwarding, and sends a processed high-priority flow to the PCS for encoding. When a low-priority flow arrives at the PLPC layer by using MAC #2, the low-priority flow needs to be buffered in a buffer-out, and is sent only when a slot that is of the low-priority flow and that is configured by an upper layer arrives, that is, the foregoing predefined sending slot.

It should be understood that when there are only two flows with different priorities, a high-priority flow may arrive at the PLPC layer based on an arrival slot configured by the upper layer in one cycle, and is forwarded to the PCS in a configured sending slot, and the PLPC buffers a low-priority flow and sends the low-priority flow strictly based on a sending slot that is for flows with different priorities and that is configured by the upper layer. For example, in FIG. 7, in one cycle, a bit block shown in a shadow of a high-priority flow sent by using the MAC #1 and a blank bit block of a low-priority stream sent by using the MAC #2 may continuously arrive in one cycle, and may occupy consecutive slots, and normal transmission of the high-priority flow is not affected by the low-priority flow.

When there are at least three flows with different priorities, using three flows with different priorities as an example, a high-priority flow may arrive at the PLPC layer based on an arrival slot configured by the upper layer in one cycle, and is forwarded to the PCS in a configured sending slot. Both a second-priority flow and a low-priority flow may arrive at the PLPC layer at any time, and are buffered in the buffer-out at the PLPC layer. The second-priority flow is sent only when a sending slot that is of the second-priority flow and that is configured by the upper layer arrives, and the low-priority flow is sent only when a sending slot that is of the low-priority flow and that is configured by the upper layer arrives. In this way, certainty transmission of flows with different priorities can be ensured, and normal transmission of a high-priority flow is not affected.

In an embodiment, the PLPC layer is further used to activate a carrier sense (CRS) signal, and the CRS is used to suppress a rate of obtaining the data signal. When data is sent excessively fast at any MAC layer, and consequently a corresponding buffer is about to overflow, the PLPC layer activates the CRS signal, to generate a CRS instruction, and a MAC signal flow sent excessively fast at the MAC layer is suppressed by setting a value of the CRS to 1. It should be understood that the CRS signal herein may be a signal generated by a PMA layer of a transmit end device, and is sent to the PLPC layer by using an upward link. Only when the data is sent excessively fast at any MAC layer, the CRS signal may be activated to generate the CRS instruction to suppress the rate of obtaining the data signal at the MAC layer.

According to the foregoing different solutions for processing the high-priority and low-priority flows by the PLPC layer, bandwidth utilization can be improved, and bandwidth waste caused by a guard band in a frame preemption process can be avoided.

S430: The PLPC layer sends the interleaved xMII signal to the PCS, so that the PCS encodes the interleaved xMII signal to generate an encoded signal.

In an embodiment, in addition to performing interleaving processing on the at least two data signals, the PLPC layer may further generate first indication information based on a type of the at least two data signals, where the first indication information is used to instruct the PCS to encode the interleaved xMII signal. The PLPC layer sends the first indication information to the PCS, so that the PCS encodes the interleaved signal based on the first indication information, to generate a plurality of code blocks. For example, the PLPC layer may generate a tx_cmd command, and the first indication information may be the tx_cmd command. The PLPC layer sends the interleaved xMII data signal (xMII signal) and a corresponding tx_cmd command to the PCS. The PCS performs operations such as encoding, segmentation, distribution, and alignment marker (AM) insertion on an input data block based on indication of the tx_cmd command.

It should be understood that, in a process of generating the tx_cmd command, whether the PLPC layer is a sublayer of the RS layer or the PLPC layer is a sublayer between the RS layer and the PCS, the PLPC can identify the received signal to generate the tx_cmd command based on information such as TX_EN, TX_ER, and TXD included in the signal and with reference to data information in the data signal, so as to instruct the PCS to encode the interleaved xMII signal. When the xMII signal is a data xMII signal, to be specific, a bit block included in the xMII signal carries data, an encoding function of a PCS of a standard port continues to be used. Refer to the correspondence between the Ethernet port types and the coding and modulation schemes listed in Table 1, the PCS selects a coding scheme based on a port type.

When the xMII signal is a non-data xMII signal, the PLPC layer may instruct the PCS to perform encoding by using different values of the tx_cmd command to obtain a corresponding code block. Specifically, a correspondence between a value of the tx_cmd command and a PCS encoding type is shown in Table 3. After receiving the tx_cmd command sent by the PLPC layer, the PCS obtains information carried in the tx_cmd command, determines, based on the information carried in the tx_cmd command, coding schemes for different bit blocks in the xMII signal, and performs encoding processing to generate a corresponding code block.

TABLE 3

| Encoding types | tx_cmd |
|---|---|
| BEACON code block | 1 |
| S code block | 2 |
| T code block | 3 |
| Data code block | 4 |
| IDLE code block | 5 |

In an embodiment, the tx_cmd command is further used to indicate a type of the interleaved signal. Specifically, with reference to FIG. 6, the xMII data signal interleaved by the PLPC layer may be a sequence shown in the figure, and the PLPC layer generates a sequence of the tx_cmd command corresponding to the xMII data signal shown in the figure. In FIG. 6, a bit block included in the xMII signal sequence is in one-to-one correspondence with the tx_cmd command. When obtaining the tx_cmd command, the PCS can determine, based on a specific value in the command, that the bit block of the xMII signal corresponding to the value carries a data signal or a non-data signal. For example, when the tx_cmd command is 4, a corresponding bit block carries a data signal.

Alternatively, the tx_cmd command is further used to indicate a start code block and/or a terminate code block in the plurality of code blocks corresponding to the interleaved signal after being encoded in one cycle. For example, with reference to FIG. 6 and Table 3, when the PCS obtains the tx_cmd command, the PCS is instructed to obtain, through encoding, a code block such as a start code block (SFD) or a terminate code block (EFD) that is of the xMII signal and that is required for frame range definition, by using several values of tx_cmd. In this way, programmable PCS is implemented. For ease of description, in this embodiment of this application, the start code block is referred to as an "S" code block, and the end code block is referred to as a "T" code block. For example, when the tx_md command is 2, a corresponding bit block may be encoded into a start code block. When the tx_cmd command is 3, a corresponding bit block may be encoded into a terminate code block.

It should be understood that Table 3 is only a possible correspondence. In an embodiment, a correspondence between a value of tx_cmd and a code block depends on an implementation process. For ports with different rates, code blocks used for frame delimitation are different. For example, for a low-speed port of 10 Mbps, a code block used for frame delimitation is a JK code block or a TR code block, and for a port with another rate such as 1 G, an S code block or a T code block is used for delimitation. Therefore, the correspondence is not fixed. In this embodiment of this application, the S code block or the T code block is used as an example for description, and is included in this application but is not limited thereto.

According to the foregoing technical solution, a physical port channelization PLPC sublayer is added to a physical layer. On the basis that an encoding function of a PCS of a standard port continues to be used, the PLPC layer directly interleaves data signals from a plurality of MAC before instructing the PCS to perform corresponding encoding. In this way, decoupling between encoding and interleaving is implemented. Finally, encoded data signals are sent through a port. This solution is not affected by a rate of an Ethernet port and a port coding scheme in a port channelization process. One port channelization solution is applicable to ports with a plurality of rates. This greatly increases technical adaptability.

It should be understood that, in a specific embodiment, a function of the PLPC layer may be enabled and disabled by a management layer by using PLPC_enable, and the PLPC layer may be configured and managed by the management layer by using PLPC_cfg.

The foregoing describes the data processing methods provided in the embodiments of this application from a sending device side with reference to FIG. 4 to FIG. 7. The following describes the data processing methods provided in the embodiments of this application from a receiving device side with reference to FIG. 8 and FIG. 9.

FIG. 8 is a flowchart of still another data processing method according to an embodiment of this application. It should be understood that the method 800 is applied to a communications device including a physical port channelization PLPC sublayer, and the PLPC layer is located between a reconciliation sublayer RS and a physical coding sublayer PCS. The following describes each operation of the method 800 in detail.

S810: The PLPC layer obtains a media independent interface xMII signal, where the xMII signal is a signal obtained after the PCS decodes an encoded signal.

It should be understood that a sending device sends the interleaved and encoded xMII signal to a receiving device, and a PCS of the receiving device receives a corresponding code block, a character, or the like, and performs corresponding decoding processing. Herein, decoding of the PCS of the receiving device corresponds to an encoding process of the PCS of the sending device. The xMII signal is sent to the PLPC layer after being decoded by the PCS.

S820: The PLPC layer performs deinterleaving processing on the xMII signal to obtain at least two data signals from different media access control clients MAC clients.

A deinterleaving processing process of a PLPC layer of the receiving device also corresponds to an interleaving processing process of a PLPC layer of the sending device. The deinterleaving processing is a processing mode of interleaving, by the PLPC layer in one cycle, the obtained xMII signal based on sending slots and a preset deinterleaving cycle table that correspond to the at least two data signals from the MAC clients. For example, an upper-layer application configures an interleaving cycle table for the PLPC layer of the sending device, and configures an interleaving cycle table for the PLPC layer of the receiving device, so that the PLPC layer of the receiving device can perform deinterleaving processing after the PLPC layer of the sending device performs interleaving processing on the data signals. In this way, accurate obtaining of data of the data signals is ensured.

The at least two data signals that are from the MAC clients and that are obtained after the PLPC layer performs the deinterleaving have different media access control layer identifiers MAC IDs, and the at least data signals from two MAC clients have different sending slots in a same cycle. In this case, the PLPC layer can determine the MAC IDs of the at least two data signals from the MAC clients based on a receiving slot that is of the xMII signal and that is in one cycle.

The at least two data signals from the MAC clients may be directly sent to different MAC layers based on the respectively corresponding sending slots. When services corresponding to the at least two data signals from the MAC clients have different priorities, for example, the at least two data signals from the MAC clients include a data signal from a first-type MAC client, the PLPC layer obtains, in a receiving slot of the data signal from the first-type MAC client, the data signal from the first-type MAC client, and sends, in a sending slot that is of the data signal from the first-type MAC client and that is in one cycle, the data signal from the first MAC.

When the at least two data signals further include a data signal from a second-type MAC client, the PLPC layer directly obtains the data signal from the second-type MAC client, and buffers the data signal from the second-type MAC client, where the data signal from the second-type MAC client includes a complete Ethernet frame, and sends, in a predefined sending slot of the data signal from the second-type MAC client, the data signal from the second-type MAC client.

In an embodiment, the data signal from the first-type MAC is obtained periodically, and the data signal from the second-type MAC client is obtained aperiodically. Whether types of the at least two obtained data signals from the MAC clients are same or not, the upper-layer application configures different sending slots for the two data signals, and corresponding processing and sending by the PLPC layer are performed based on a configured slot.

Figure 9:
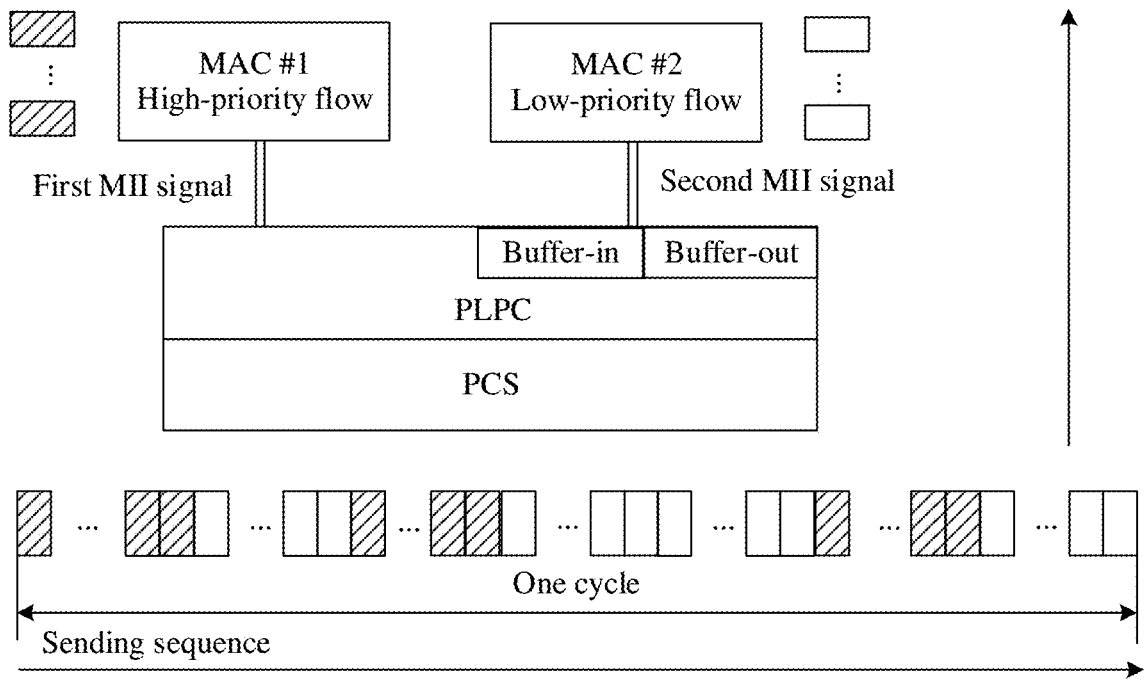
FIG. 9 is a schematic diagram of processing data by a receiving device according to an embodiment of this application.

FIG. 9 is a schematic diagram of processing data by a receiving device according to an embodiment of this application. Two data signals are used as an example. In an egress port direction of a receiving device shown in FIG. 9, a PLPC layer determines that data arrived in a first slot range as data to be sent to MAC #1, and determines that data arrived in a slot other than the first slot range in a sending cycle of one xMII signal as data to be sent to MAC #2, where the first slot range may include a plurality of slots of the sending cycle of one xMII signal. For example, in FIG. 9, data to be sent in a slot shown in a shaded part in one cycle is the data of the MAC #1, and data to be sent in a slot shown in a blank part is the data of the MAC #2. The PLPC layer may determine MAC IDs of the at least two data signals based on different slots configured by different MAC layers. In this way, the data signals are accurately sent.

When a priority of a service 1 corresponding to the data to be sent to the MAC #2 is lower than a priority of a service 2 corresponding to the data to be sent to the MAC #2, the PLPC layer directly sends a MAC ID that serves as the data of the MAC #1 and that is obtained after being deinterleaved based on a sending cycle and a slot that are configured for the service 1, and the PLPC layer buffers (buffer-out) a MAC ID that serves as the data of the MAC #2 before sending a complete frame structure to the MAC #2 based on a sending cycle and a slot that are configured for the service 2 when receiving the complete frame structure of the data signal because it is likely that one complete data frame (an Ethernet frame) for the MAC #1 can be completely sent in a plurality of sending cycles.

The foregoing completes an entire process of data processing provided in this embodiment of this application. A physical port channelization PLPC sublayer is added to a physical layer. On the basis that an encoding function of a PCS of a standard port continues to be used, the PLPC layer directly interleaves data signals from a plurality of MAC before instructing the PCS to perform corresponding encoding. In this way, decoupling between encoding and interleaving is implemented. Finally, encoded data signals are sent through a port. This solution is not affected by a rate of an Ethernet port and a port coding scheme in a port channelization process. One port channelization solution is applicable to ports with a plurality of rates. This greatly increases technical adaptability.

The foregoing describes the communication method in the embodiments of this application in detail with reference to FIG. 4 to FIG. 9. The following describes the data processing apparatus in the embodiments of this application in detail with reference to FIG. 10 and FIG. 11.

Figure 10:
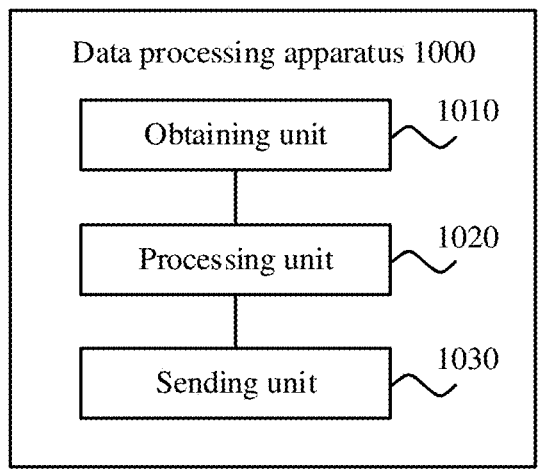
FIG. 10 is a schematic block diagram of a data processing apparatus according to an embodiment of this application.

FIG. 10 is a schematic block diagram of a data processing apparatus 1000 according to an embodiment of this application. The apparatus is connected to media independent interfaces xMIIs with different Ethernet rates. As shown in FIG. 10, the communications apparatus 1000 includes an obtaining unit 1010, a processing unit 1020, and a sending unit 1030.

The obtaining unit 1010 is configured to obtain at least two data signals from different media access control clients MAC clients.

The processing unit 1020 is configured to perform interleaving processing on the at least two data signals from the MAC clients, to generate an interleaved xMII signal.

The sending unit 1030 is configured to send the interleaved xMII signal to the PCS, so that the PCS encodes the interleaved xMII signal to generate an encoded signal.

In an embodiment, the processing unit 1020 is further configured to generate first indication information based on the at least two data signals from the MAC clients, where the first indication information is used to indicate a coding scheme for the PCS to encode the interleaved xMII signal. The sending unit 1030 is further configured to send the first indication information to the PCS, so that the PCS encodes the interleaved xMII signal based on the first indication information, to generate the encoded signal.

Alternatively, the first indication information is further used to indicate a type of the interleaved xMII signal.

Alternatively, the first indication information is further used to indicate a start symbol and/or an end symbol corresponding to the interleaved xMII signal in one cycle.

In an embodiment, the interleaving processing is a processing mode of interleaving, by the processing unit in one cycle, the at least two data signals from the MAC clients based on sending slots and a preset interleaving cycle table that correspond to the at least two data signals from the MAC clients.

In an embodiment, the at least two data signals that are from the MAC clients and that are obtained by the obtaining unit 1010 include a data signal from a first-type MAC client. The obtaining unit is configured to obtain, in an arrival slot of the data signal from the first-type MAC client, the data signal from the first MAC client. The sending unit is configured to send, in a sending slot that is of the data signal from the first-type MAC client and that is in one cycle, the data signal from the first-type MAC client.

When the at least two data signals that are from the MAC clients and that are obtained by the obtaining unit 1010 further include a data signal from a second-type MAC client. The obtaining unit is configured to directly obtain the data signal from the second MAC client, and buffer the data signal from the second MAC client. The sending unit is further configured to send, in a predefined sending slot of the data signal from the second MAC client, the data signal from the second MAC client.

The at least two data signals have different media access control layer identifiers MAC IDs, and the at least two data signals have different sending slots in a same cycle.

In an embodiment, the processing unit 1020 is further configured to activate a carrier sense CRS signal, and the CRS is used to suppress a rate of obtaining the data signal.

It should be understood that the communications apparatus 1000 may correspond to (for example, may be configured as or may be) the physical sublayer PLPC entity described in the method 400, and may be configured to perform various actions performed by the PLPC entity in the method 400 and various possible processes listed above. For brevity, details are not described herein.

It should be further understood that the data processing apparatus 1000 shown in FIG. 10 is only an example. The apparatus in this embodiment of this application may further include another module or unit, or a module with a function similar to that of each module in FIG. 10, or may not necessarily include all modules in FIG. 10.

Figure 11:
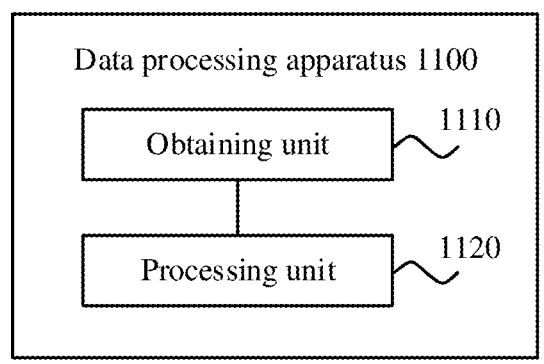
FIG. 11 is a schematic block diagram of another data processing apparatus according to an embodiment of this application.

FIG. 11 is a schematic block diagram of a data processing apparatus 1100 according to an embodiment of this application. The apparatus is connected to media independent interfaces xMIIs with different Ethernet rates. As shown in FIG. 11, the apparatus 1100 includes an obtaining unit 1110 and a processing unit 1120.

The obtaining unit 1110 is configured to obtain a media independent interface xMII signal, where the xMII signal is a signal obtained after a PCS decodes an encoded signal.

The processing unit 1120 is configured to perform deinterleaving processing on the xMII signal to obtain at least two data signals from different media access control clients MAC clients.

In an embodiment, the at least two data signals from the MAC clients have different media access control layer identifiers MAC IDs, and the at least two data signals from MAC clients have different sending slots in a same cycle.

In an embodiment, the processing unit 1120 determines the MAC IDs of the at least two data signals from the MAC clients based on a receiving slot that is of the xMII signal and that is in one cycle.

In an embodiment, the deinterleaving processing is a processing mode of interleaving, by the processing unit in one cycle, the obtained xMII signal based on sending slots and a preset interleaving cycle table that correspond to the at least two data signals from the MAC clients.

In an embodiment, the at least two data signals from the MAC clients include a data signal from a first-type MAC client. The obtaining unit obtains, in a receiving slot of the data signal from the first-type MAC client, the data signal from the first-type MAC client. The apparatus 1100 further includes:

a first sending unit, configured to send, in a sending slot that is of the data signal from the first-type MAC client and that is in one cycle, the data signal from the first MAC.

Alternatively, the at least two data signals further include a data signal from a second-type MAC client. The obtaining unit directly obtains the data signal from the second-type MAC client, and buffers the data signal from the second-type MAC client, where the data signal from the second-type MAC client includes a complete Ethernet frame. The apparatus further includes:

a second sending unit, configured to send, in a predefined sending slot of the data signal from the second-type MAC client, the data signal from the second-type MAC client.

In an embodiment, the data signal from the first-type MAC is obtained periodically, and the data signal from the second-type MAC client is obtained aperiodically. Whether types of the at least two obtained data signals from the MAC clients are same or not, an upper-layer application configures different sending slots for the two data signals, and corresponding processing and sending by the PLPC layer are performed based on a configured slot.

It should be understood that the communications apparatus 1100 may correspond to (for example, may be configured as or may be) the physical sublayer PLPC entity described in the method 800, and may be configured to perform various actions performed by the PLPC entity in the method 800 and various possible processes listed above. For brevity, details are not described herein.

It should be further understood that the data processing apparatus 1100 shown in FIG. 11 is only an example. The apparatus in this embodiment of this application may further include another module or unit, or a module with a function similar to that of each module in FIG. 11, or may not necessarily include all modules in FIG. 11.

Figure 12:
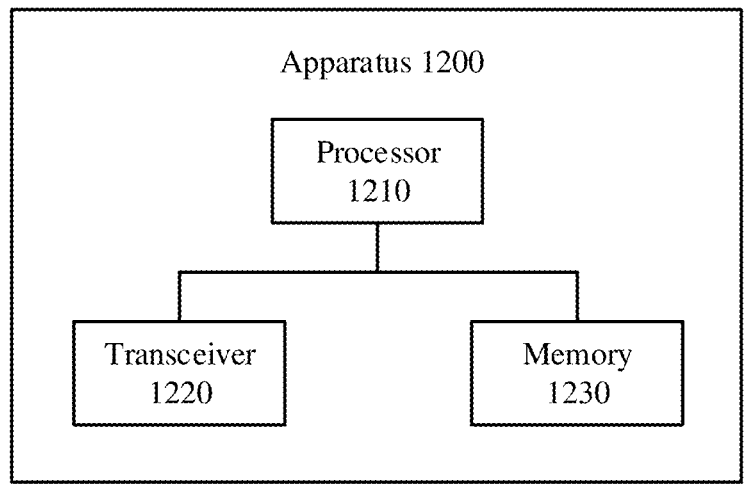
FIG. 12 is a schematic block diagram of still another data processing apparatus according to an embodiment of this application.

FIG. 12 is a schematic block diagram of an apparatus 1200 according to an embodiment of this application. The apparatus 1200 may correspond to the data processing apparatus in FIG. 10 or FIG. 11, and the data processing apparatus 1200 may have a hardware architecture shown in FIG. 12. The apparatus may include a processor 1210, a transceiver 1220, and a memory 1230. The processor 1210, the transceiver 1220, and the memory 1230 communicate with each other through an internal connection path. Related functions implemented by the processing unit 1020 in FIG. 10 or the processing unit 1120 in FIG. 11 may be implemented by the processor 1210, and related functions implemented by the obtaining unit 1010 in FIG. 10, the sending unit 1030 in FIG. 10, or the obtaining unit 1110 in FIG. 11 may be implemented by the processor 1210 by controlling the transceiver 1220.

The processor 1210 may include one or more processors, for example, include one or more central processing units (central processing unit, CPU). When the processor includes one CPU, the CPU may be a single-core CPU or a multi-core CPU.

The transceiver 1220 is configured to send data and/or a signal, and receive data and/or a signal. The transceiver 1220 may include a transmitter and a receiver. The transmitter is configured to send data and/or a signal, and the receiver is configured to receive data and/or a signal. It should be understood that the transceiver may be a transceiver module, a transceiver interface, or the like in a wired connection. This is not limited in this embodiment of this application.

The memory 1230 includes but is not limited to a random access memory (RAM), a read-only memory (ROM), an erasable programmable memory (EPROM), a compact disc read-only memory (CD-ROM), and the like. The memory 1230 is configured to store a related instruction and data.

The memory 1230 is configured to store program code and data of a storage apparatus, and may be an independent component or integrated into the processor 1210. This is not limited in this embodiment of this application.

Specifically, the processor 1210 is configured to control the transceiver to perform data transmission in the communication method 400. For details, refer to description in the method 400 embodiment, and details are not described herein.

Alternatively, the processor 1210 is configured to control the transceiver to perform data transmission in the communication method 500. For details, refer to description in the method 1000 embodiment, and details are not described herein.

Alternatively, the processor 1210 is configured to control the transceiver to perform data transmission in the communication method 600. For details, refer to description in the method 1200 embodiment, and details are not described herein.

It can be understood that FIG. 12 shows only a simplified design of the apparatus. In an embodiment, the apparatus may further include other necessary components, including but not limited to any quantity of transceivers, processors, controllers, memories, and the like, and all apparatuses that can implement this application shall fall within the protection scope of this application.

In an embodiment, the apparatus 1200 may be a chip apparatus. The chip apparatus may include at least one chip, and the chip may be a field programmable gate array, a dedicated integrated chip, a system chip, a central processing unit, a network processor, a digital signal processing circuit, or a microcontroller for implementing related functions. A programmable controller or another integrated chip may be alternatively used. The chip may include one or more memories, configured to store program code. When the code is executed, the apparatus is enabled to implement a corresponding function.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is only an example. Division into the units is only logical function division and may be other division in actual implementation. For example, a plurality of units or components may be combined. In addition, the displayed or discussed mutual couplings or communication connections may be indirect couplings or communication connections through some interfaces, devices, or units.

In addition, functional units in the embodiments of this application may be integrated into one physical entity, or each of the units separately corresponds to one physical entity, or two or more units are integrated into one physical entity.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are only specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method, comprising:
   obtaining at least two data signals from different media access control (MAC) clients;
   performing interleaving processing on the at least two data signals from the MAC clients, to generate an interleaved media independent interface (xMII) signal; and
   sending the interleaved xMII signal to a physical coding sublayer (PCS), so that the PCS encodes the interleaved xMII signal to generate an encoded signal.

2. The method according to claim 1, further comprising:
   generating first indication information used to instruct the PCS to encode the interleaved xMII signal; and
   sending the first indication information to the PCS, so that the PCS encodes the interleaved xMII signal based on the first indication information, to generate the encoded signal.

3. The method according to claim 2, wherein the first indication information is further used to indicate a type of the interleaved xMII signal.

4. The method according to claim 2, wherein the first indication information is further used to indicate the interleaved xMII signal used for a start symbol and/or an end symbol of frame delimitation.

5. The method according to claim 1, wherein the interleaving processing is a processing mode of interleaving, in one cycle, the at least two data signals from the MAC clients based on sending slots and a preset interleaving cycle table that correspond to the at least two data signals from the MAC clients.

6. The method according to claim 1, wherein the at least two data signals from the MAC clients comprise a data signal from a first-type MAC client, and the obtaining at least two data signals from different MAC clients comprises:
   obtaining, by a first sublayer in an arrival slot of the data signal from the first-type MAC client, the data signal from the first MAC client; and
   sending, in a sending slot that is of the data signal from the first-type MAC client and that is in one cycle, the data signal from the first-type MAC client.

7. The method according to claim 1, wherein the at least two data signals from the MAC clients further comprise a data signal from a second-type MAC client, and the obtaining at least two data signals from different MAC clients comprises:
   directly obtaining, by a first sublayer, the data signal from the second MAC client, buffering the data signal from the second MAC client; and
   sending, in a predefined sending slot of the data signal from the second MAC client, the data signal from the second MAC client.

8. The method according to claim 7, wherein the first sublayer is further used to activate a carrier sense (CRS) signal, and the CRS is used to suppress a rate of obtaining the data signal.

9. The method according to claim 1, wherein the at least two data signals have different media access control layer identifiers (MAC IDs), and the at least two data signals have different sending slots in a same cycle.

10. A data processing method, comprising:
    obtaining a media independent interface (xMII) signal, wherein the xMII signal is a signal obtained after a physical coding sublayer (PCS) decodes an encoded signal; and
    performing deinterleaving processing on the xMII signal to obtain at least two data signals from different media access control (MAC) clients.

11. The method according to claim 10, wherein the at least two data signals from the MAC clients have different media access control layer identifiers (MAC IDs), and the at least two data signals from the MAC clients have different sending slots in a same cycle.

12. A data processing apparatus, comprising:
    an obtaining unit to obtain at least two data signals from different media access control (MAC) clients;
    a processing unit to perform interleaving processing on the at least two data signals from the MAC clients, to generate an interleaved media independent interface (xMII) signal; and
    a sending unit to send the interleaved xMII signal to a physical coding sublayer (PCS), so that the PCS encodes the interleaved xMII signal to generate an encoded signal.

13. The apparatus according to claim 12, wherein the processing unit is further configured to generate first indication information, wherein the first indication information is used to instruct the PCS to encode the interleaved xMII signal; and
    the sending unit is further configured to send the first indication information to the PCS, so that the PCS encodes the interleaved xMII signal based on the first indication information, to generate the encoded signal.

14. The apparatus according to claim 13, wherein the first indication information is further used to indicate a type of the interleaved xMII signal.

15. The apparatus according to claim 13, wherein the first indication information is further used to indicate the interleaved xMII signal used for a start symbol and/or an end symbol of frame delimitation.

16. The apparatus according to claim 12, wherein the interleaving processing is a processing mode of interleaving, in one cycle, the at least two data signals from the MAC clients based on sending slots and a preset interleaving cycle table that correspond to the at least two data signals from the MAC clients.

17. The apparatus according to claim 12, wherein the at least two data signals that are from the MAC clients and that are obtained by the obtaining unit comprise a data signal from a first-type MAC client, and the obtaining unit is configured to obtain, in an arrival slot of the data signal from the first-type MAC client, the data signal from the first MAC client; and the sending unit is configured to send, in a sending slot that is of the data signal from the first-type MAC client and that is in one cycle, the data signal from the first-type MAC client.

18. The apparatus according to claim 12, wherein the at least two data signals that are from the MAC clients and that are obtained by the obtaining unit further comprise a data signal from a second-type MAC client;

the obtaining unit is configured to directly obtain the data signal from the second MAC client, and buffer the data signal from the second MAC client; and the sending unit is further configured to send, in a predefined sending slot of the data signal from the second MAC client, the data signal from the second MAC client.

19. The apparatus according to claim 12, wherein the processing unit is further configured to activate a carrier sense (CRS) signal, and the CRS is used to suppress a rate of obtaining the data signal.

20. The apparatus according to claim 12, wherein the at least two data signals have different media access control layer identifiers MAC IDs, and the at least two data signals have different sending slots in a same cycle.

\* \* \* \* \*